(12) United States Patent
Park et al.

(10) Patent No.: US 9,032,005 B2
(45) Date of Patent: May 12, 2015

(54) RANDOM NUMBER GENERATION METHOD AND APPARATUS USING LOW-POWER MICROPROCESSOR

(71) Applicant: Electronics and Telecommunications Research Institute, Daejeon (KR)

(72) Inventors: Dae-Seon Park, Daejeon (KR); In-Seok Kang, Daejeon (KR); Byeong-Ho Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 13/896,390

(22) Filed: May 17, 2013

(65) Prior Publication Data

US 2013/0318139 A1 Nov. 28, 2013

(30) Foreign Application Priority Data

May 22, 2012 (KR) .................. 10-2012-0053990
Feb. 18, 2013 (KR) .................. 10-2013-0016983

(51) Int. Cl.
*G06F 7/58* (2006.01)

(52) U.S. Cl.
CPC ............ *G06F 7/582* (2013.01); *G06F 7/588* (2013.01)

(58) Field of Classification Search
CPC ............................. G06F 7/58–7/588
USPC ................................. 708/250–256
See application file for complete search history.

(56) References Cited

U.S. PATENT DOCUMENTS

| 6,044,388 | A | * | 3/2000 | DeBellis et al. | ............... 708/254 |
| 8,001,054 | B1 | | 8/2011 | Peart et al. | |
| 2008/0126458 | A1 | | 5/2008 | Shin | |
| 2010/0022187 | A1 | | 1/2010 | Ohkita | |
| 2010/0332574 | A1 | * | 12/2010 | Herbert et al. | ................ 708/251 |

FOREIGN PATENT DOCUMENTS

| JP | 2010-028666 A | 2/2010 |
| KR | 10-2008-0015184 A | 2/2008 |
| KR | 10-2010-0003301 A | 1/2010 |
| KR | 10-2011-0029164 A | 3/2011 |
| WO | 2008/131444 A2 | 10/2008 |
| WO | 2010/005784 A1 | 1/2010 |

OTHER PUBLICATIONS

NIST Special Publication 800-90A, Recommendation for Random Number Generation Using Deterministic Random Bit Generators, Elaine Barker and John Kelsey (Jan. 2012).*

* cited by examiner

*Primary Examiner* — Chat Do
*Assistant Examiner* — Andrew J Campbell
(74) *Attorney, Agent, or Firm* — LRK Patent Law Firm

(57) ABSTRACT

A random number generation method and apparatus using a low-power microprocessor is provided. In the random number generation method, a low-power microprocessor determines whether external power is supplied to a random number generator. The low-power microprocessor updates an internal state of the random number generator based on a first scheme if it is determined that the external power is supplied to the random number generator. The low-power microprocessor updates the internal state of the random number generator based on a second scheme different from the first scheme if it is determined that the external power is not supplied to the random number generator.

9 Claims, 6 Drawing Sheets

RANDOM NUMBER GENERATION METHOD AND APPARATUS USING LOW-POWER MICROPROCESSOR

CROSS REFERENCE TO RELATED APPLICATIONS

This application claims the benefit of Korean Patent Application Nos. 10-2012-0053990, filed on May 22, 2012 and 10-2013-0016983 filed on Feb. 18, 2013, which are hereby incorporated by reference in their entireties into this application.

BACKGROUND OF THE INVENTION

1. Technical Field

The present invention relates generally to random number generation technology and, more particularly, to a random number generator, which manages the seed of the random number generator so that the seed cannot be predicted, thus providing the confidentiality and integrity of random numbers required for authentication and encryption.

2. Description of the Related Art

Microprocessor-based random number generators are mainly classified into two schemes, that is, a scheme which generates random numbers required for application programs through the preprocessing and correction processing of noise collected by external hardware noise sources, and a scheme which allows a microprocessor to directly generate random numbers using an initial seed value for random numbers and a random number generation algorithm.

An application program provides the confidentiality and integrity of an application using generated random numbers, and may provide services, such as authentication and encryption services.

FIGS. 1 and 2 are block diagrams showing conventional random number generators.

Referring to FIG. 1, a random number generator 110 includes a hardware noise source 101, a correction algorithm unit 102, an external power source 103, and a microprocessor 104.

The hardware noise source 101 generates noise used to generate random numbers using a ring oscillator, a thermal noise diode, or the like.

The correction algorithm unit 102 corrects collected hardware noise using software and then improves random number characteristics.

The external power source 103 supplies power to the random number generator 110.

The microprocessor 104 generates a random number sequence using the collected hardware noise, and provides the generated random number sequence when an application program unit 105 requests the random number sequence.

The application program unit 105 requests a random number (or a random number sequence) required for encryption or authentication.

Referring to FIG. 2, a random number generator 210 includes an external power source 206, a microprocessor 207, an initial value provision unit 209, and a random number generation algorithm unit 201.

The external power source 206 supplies power to the random number generator 210.

The microprocessor 207 generates a random number sequence using an initial value and a random number generation algorithm, and provides the generated random number sequence when an application program unit 208 requests the random number sequence.

The application program unit 208 requests a random number (or a random number sequence) required for encryption or authentication.

The initial value provision unit 209 provides an initial seed value used for the random number generation algorithm.

The random number generation algorithm unit 201 generates a random number using a message digest algorithm, such as a Secure Hashing Algorithm (SHA).

The random number generators shown in FIGS. 1 and 2 are configured to update the seed using a scheme for generating new unpredictable seeds from an internal state configured using a plurality of various entropy sources, together with the seed at a previous time point. Consequently, unless sufficient entropy is guaranteed to external noise sources in the random number generation algorithm based on seeds, a random number at a subsequent time point is predictable.

Furthermore, the conventional random number generators shown in FIGS. 1 and 2 are operated only when power is supplied to the microprocessor, and are not operated when power is not supplied, thus causing a disadvantage in that the seed of the random number generator is not updated.

Therefore, a new random number generation scheme for always generating unpredictable random numbers using a random number generation algorithm in which external hardware noise sources and seeds are used, and a new seed management scheme therefor am urgently required.

Prior art related to the above technology includes U.S. Pat. No. 8,001,054 presenting a system and method for generating an unpredictable random number using a seeded algorithm (entitled "System and method for generating an unpredictable number using a seeded algorithm").

SUMMARY OF THE INVENTION

Accordingly, the present invention has been made keeping in mind the above problems occurring in the prior art, and an object of the present invention is to cause random numbers, generated regardless of whether power is supplied, to be unpredictable, by performing suitable seed (internal state) updates even in situations in which power is not supplied, thus guaranteeing the confidentiality and integrity of authentication and encryption.

Another object of the present invention is to cause unpredictable random numbers to be efficiently generated by using different seed (internal state) update schemes when power is supplied and when power is not supplied, and to prevent identical output random number sequences from being generated.

A further object of the present invention is to provide unpredictable random numbers by performing minimal seed (internal state) updates even when operation is performed using a battery.

In accordance with an aspect of the present invention to accomplish the above objects, there is provided a random number generation method including determining, by a low-power microprocessor, whether external power is supplied to a random number generator; updating, by the low-power microprocessor, an internal state of the random number generator based on a first scheme if it is determined that the external power is supplied to the random number generator; and updating, by the low-power microprocessor, the internal state of the random number generator based on a second scheme different from the first scheme if it is determined that the external power is not supplied to the random number generator.

Preferably, updating the internal state of the random number generator based on the second scheme may be configured to update the internal state of the random number generator in consideration of one or more of requirements specifying whether a timer event has occurred and whether the internal state of the random number generator satisfies a preset condition, by using power supplied from a battery.

Preferably, the preset condition may be related to whether a preset bit of the internal state has been designated as a preset value.

Preferably, updating the internal state of the random number generator based on the first scheme may be configured to continuously generate a random number and update the internal state while in a standby state, generate and provide a requested random number when an application program requests the random number, and then return to the standby state.

Preferably, the internal state may be updated by generating a random number using an internal state at a previous time point, noise source data generated using an external hardware noise source, and a time value of a Real-Time Clock (RTC).

Preferably, the noise source data may be corrected using a preset correction algorithm so as to improve random number characteristics.

In accordance with another aspect of the present invention to accomplish the above objects, there is provided a random number generator including a battery for supplying power when external power is not supplied; a power switching circuit for selecting one of the external power and the power supplied from the battery based on a difference between voltages of the external power and the power supplied from the battery; and a low-power microprocessor for updating an internal state required to generate a random number based on a first scheme using the external power, and for updating the internal state based on a second scheme different from the first scheme using the power supplied from the battery.

Preferably, the random number generator may further comprise a hardware noise source for generating noise source data required to generate the random number; and a Real-Time Clock (RTC) for generating a time value required to generate the random number.

Preferably, the second scheme may be configured to update the internal state of the random number generator in consideration of one or more of requirements specifying whether a timer event has occurred and whether the internal state of the random number generator satisfies a preset condition, by using power supplied from a battery.

Preferably, the preset condition may be related to whether a preset bit of the internal state has been designated as a preset value.

Preferably, the first scheme may be configured to continuously generate a random number and update the internal state while in a standby state, generate and provide a requested random number when an application program requests the random number, and then return to the standby state.

Preferably, the internal state may be updated by generating a random number using an internal state at a previous time point noise source data generated using an external hardware noise source, and a time value of a Real-Time Clock (RTC).

Preferably, the noise source data may be corrected using a preset correction algorithm so as to improve random number characteristics.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
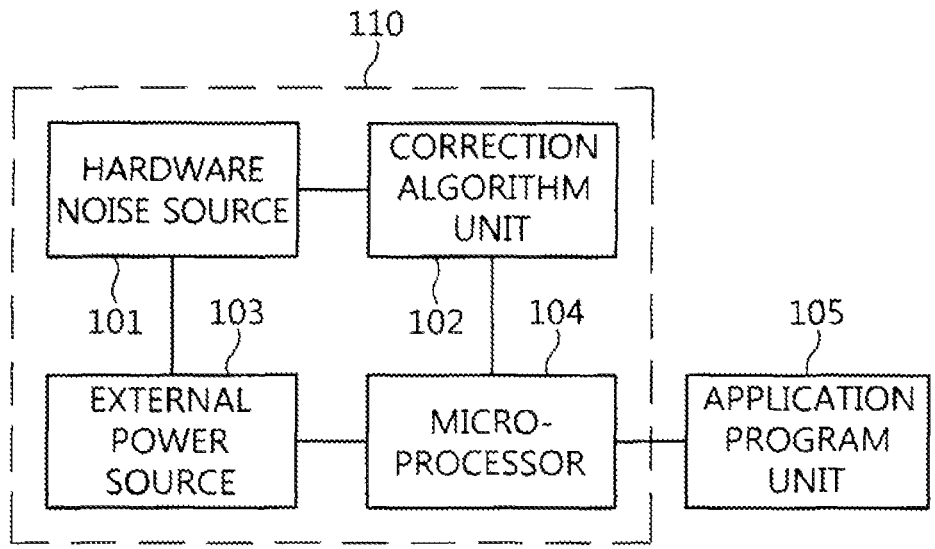
FIGS. 1 and 2 are block diagrams showing conventional random number generators.
Figure 2:
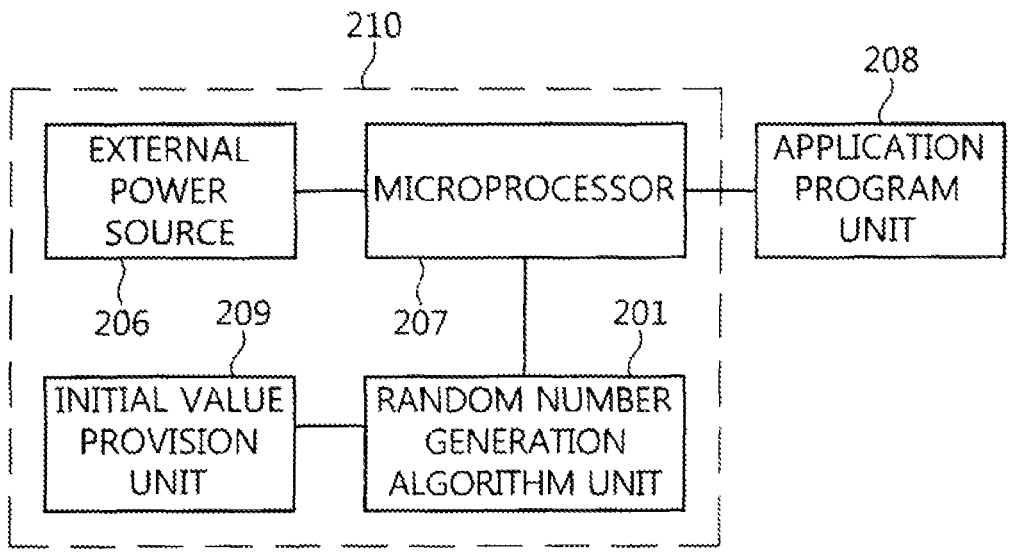

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

In the present invention, a low-power microprocessor changes to an active mode using battery power when a timer event occurs. In this case, a specific bit of the internal state (state information) of a random number generator updated at a previous time point is checked, and then the internal state of the random number generator is updated. The update of the internal state of the random number generator may be performed using the internal state of the random number generator at the previous time point, a separate hardware noise source, time information, temperature information, etc., and updated state information may be stored in memory.

When power is supplied, the microprocessor initializes the random number generator using the internal state (state information) stored in the internal memory, and may enter a standby state while continuously updating the internal state of the random number generator. In this case, when an application program requests a random number, the microprocessor generates a requested random number, transmits the random number, and returns to the standby state. The random number that is generated and transmitted to the application program in this way may be used for authentication and encryption/decryption.

Hereinafter, preferred embodiments of the present invention will be described in detail with reference to the attached drawings.

Figure 3:
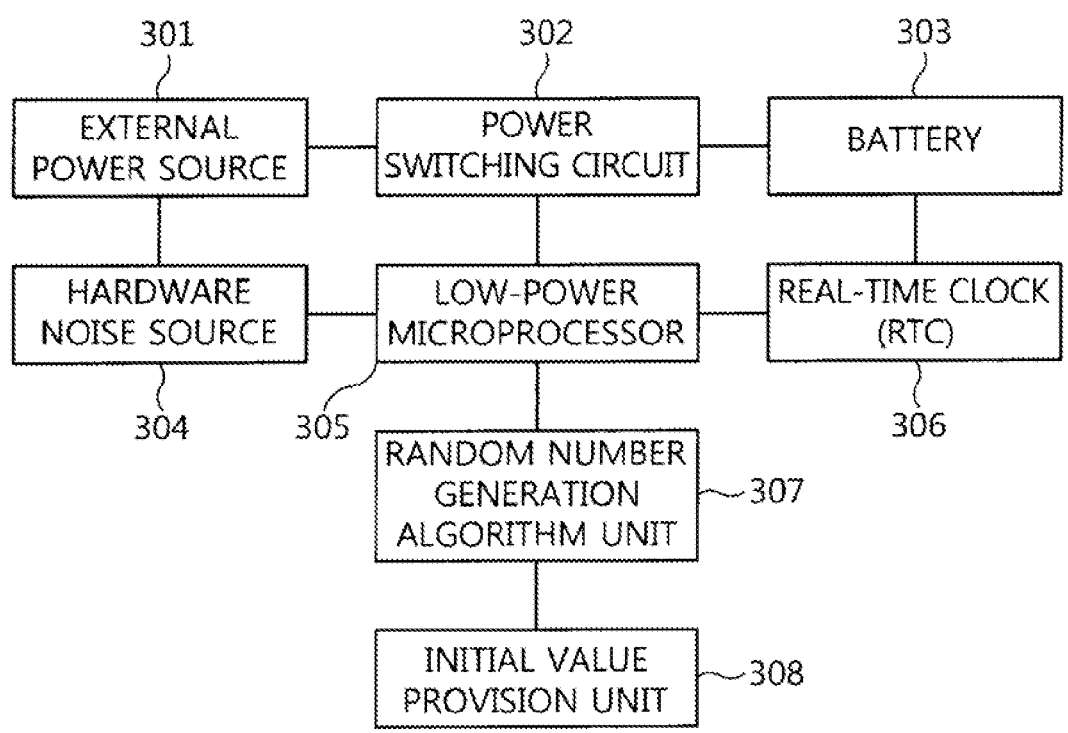
FIG. 3 is a block diagram showing a random number generator according to an embodiment of the present invention.

FIG. 3 is a block diagram showing a random number generator according to an embodiment of the present invention.

Referring to FIG. 3, a random number generator according to an embodiment of the present invention includes an external power source 301, a power switching circuit 302, a battery 303, a hardware noise source 304, a low-power microprocessor 305, and a Real-Time Clock (RTC) 306.

In this case, the random number generator may further include a random number generation algorithm unit 307 and an initial value provision unit 308. In some embodiments, the random number generation algorithm unit 307 and the initial value provision unit 308 may be provided in the low-power microprocessor 305. For example, the random number generation algorithm unit 307 may be stored in the internal memory of the low-power microprocessor 305, and may perform even functions of generating a random number, updating a seed (internal state), and transferring the random number when an application program requests the random number. In this case, the random number generation algorithm may be obtained by implementing a message digest algorithm, such as a Secure Hashing Algorithm (SHA), using software.

The external power source 301 supplies power to the random number generator.

The battery 303 supplies power when power is not supplied from the external power source 301.

The power switching circuit 302 performs a supply power switching function so that any one of the external power source 301 and the battery 303 is selected based on a difference between the voltages of the powers supplied from the external power source 301 and the battery 303.

The hardware noise source 304 is used as a noise source, such as a ring oscillator or a thermal noise diode.

The low-power microprocessor 305 corrects the hardware noise source 304, updates a random number seed (internal state) by executing a random number generation algorithm provided by the random number generation algorithm unit 307, and then transfers a generated random number to an application program.

The RTC 306 provides a time value used as an external input factor for the random number generation algorithm.

The random number generation algorithm unit 307 provides an algorithm for generating a random number using a seed (internal state) at a previous time point, the hardware noise source 304, and the RTC 306.

The initial value provision unit 308 provides the initial seed (initial internal state) of the random number generator.

The external power source 301 supplies power required to operate the random number generator according to the present invention. The battery 303 supplies power required to operate the low-power microprocessor 305, the RTC 306, the hardware noise source 304, etc. when power is not supplied from the external power source 301.

The random number generator according to the present invention may be operated even when external power is not supplied, as well as when external power is supplied. In this case, the power switching circuit 302 determines a difference between the voltages of the external power source 301 and the battery 303, selects a power source to be used by the random number generator, and supplies power through the selected power source.

The hardware noise source 304 is an external noise source, such as a ring oscillator or a thermal noise diode, and provides noise source data, having a specific length, required when the random number generation algorithm is executed. In this case, a separate correction algorithm may be used to improve the noise characteristics of the hardware noise source 304. The RTC 306, together with the hardware noise source 304, are used as the input entropy sources of the random number generation algorithm under the control of the low-power microprocessor 305, and provides a time value for the system when the application program requires the time value.

The low-power microprocessor 305 is configured to, if power is not supplied, read the seed (internal state) of the random number generator stored in the internal memory area thereof, read a time value checked using the random number generator seed at the previous time point, hardware noise source data collected at a current time point, and a time value checked using the RTC, and then execute the random number generation algorithm.

The low-power microprocessor 305 is configured to, if the external power is supplied, initialize the random number generator using the random number generator seed (internal state) at the previous time point, and provide a required random number when an application program requests the random number. After the requested random number has been provided, the low-power microprocessor 305 may update the internal state of the random number generator so as to continuously execute the random number generation algorithm while in a system standby state.

In this case, the random number generation algorithm may be an algorithm executed using a function required to digest a message, as in the case of a Secure Flashing Algorithm (SHA). The random number generation algorithm may generate a random number using an initial value for the internal state of the random number generator, the hardware noise source 304, and the time value at the time point of generation of the random number, provided by the RTC 306, and may update the internal state (seed).

The low-power microprocessor 305 is configured to, if external power is not supplied, read the internal state (seed) stored in the internal memory area thereof, and read the internal state of the random number generator at the previous time point, hardware noise source data collected at the current time point, and the time value, thus executing the random number generation algorithm. When the power is supplied from the external power source 301, the low-power microprocessor 305 according to the present invention initializes the random number generator using the internal state of the random number generator at the previous time point, and provides a required random number if an application program requests the random number. Further, after the requested random number has been provided, the internal state is updated so as to continuously execute the random number generation algorithm while in a system standby state.

That is, the low-power microprocessor 305 updates the internal state required to generate a random number based on a first scheme by using power supplied from the external power source 301, and updates the internal state based on a second scheme different from the first scheme by using power supplied from the battery 303.

Figure 4:
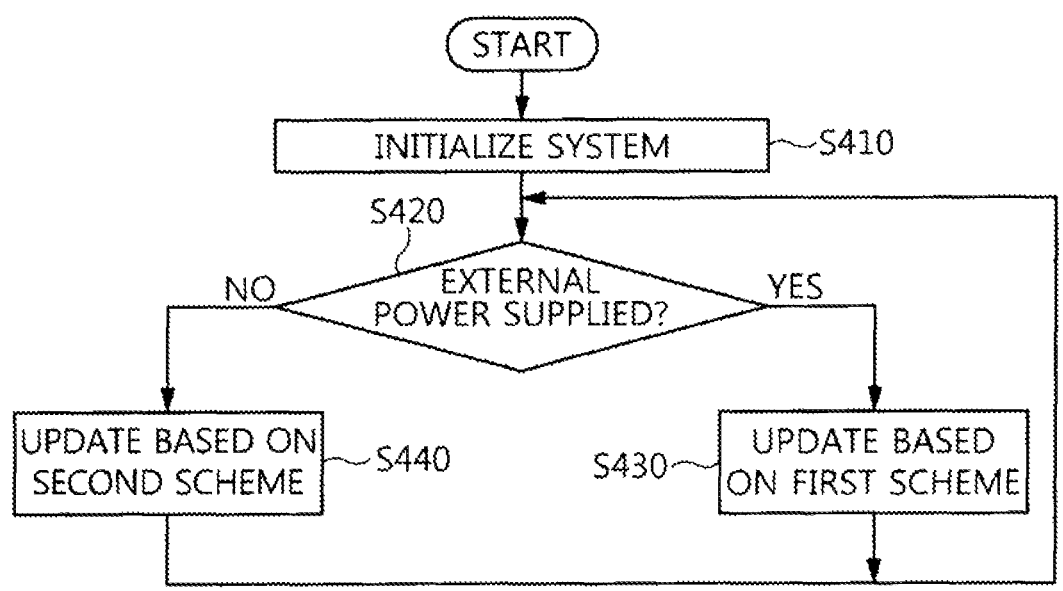
FIG. 4 is an operation flowchart showing a random number generation method using a low-power microprocessor according to an embodiment of the present invention.

FIG. 4 is an operation flowchart showing a random number generation method using a low-power microprocessor according to an embodiment of the present invention.

Referring to FIG. 4, in the random number generation method according to the embodiment of the present invention, an operation required to initialize the system of the random number generator is performed at step S410.

In this case, step S410 may be configured to initialize memory resources and other principal devices required to use the system.

Further, in the random number generation method according to the embodiment of the present invention, it is determined whether external power is supplied to the random number generator at step S420.

In this case, step S420 may be performed by comparing the level of the external power with the power level of the battery.

As a result of the determination at step S420, if it is determined that the external power is supplied to the random number generator, the random number generation method according to the embodiment of the present invention is configured to update the internal state of the random number generator based on a first scheme at step S430.

As a result of the determination at step S420, if it is determined that external power is not supplied to the random number generator, the random number generation method according to the embodiment of the present invention is configured to update the internal state of the random number generator based on a second scheme at step S440.

Here, the second scheme is different from the fast scheme.

Step S440 may be configured to update the internal state of the random number generator in consideration of one or more of requirements specifying whether a timer event has occurred and whether the internal state of the random number generator satisfies a preset condition, by using the power supplied from the battery.

In this case, the preset condition may be a condition related to whether a preset bit of the internal state has been designated as a preset value.

Here, step S430 may be the step of continuously generating a random number and updating the internal state while in a standby state, generating and providing a requested random number if an application program requests the random number, and thereafter returning to the standby state.

In this case, the internal state may be updated by generating a random number using the internal state at the previous time point, noise source data generated using the external hardware noise source, and the time value of the RTC.

Here, the noise source data may be data corrected using a preset correction algorithm so as to improve the characteristics of random numbers.

Figure 5:
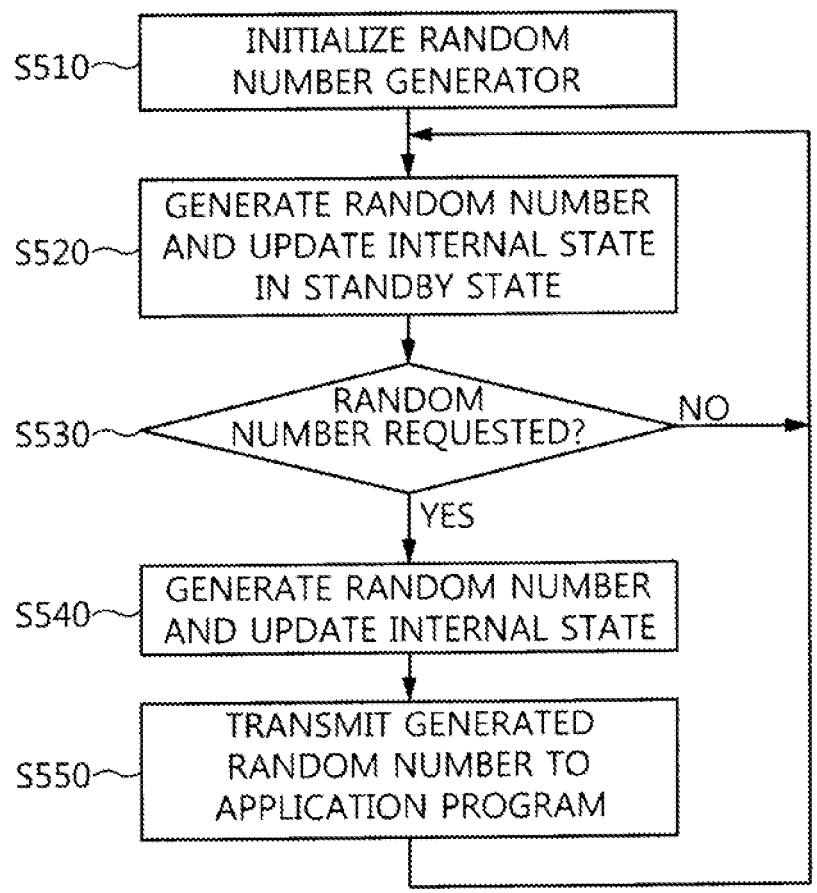
FIG. 5 is an operation flowchart showing an example of the step of updating an internal state based on a first scheme shown in FIG. 4.

FIG. 5 is an operation flowchart showing an example of the step of updating the internal state based on the first scheme shown in FIG. 4.

Referring to FIG. 5, the step of updating the internal state based on the first scheme is configured to first initialize the random number generator at step S510.

After the random number generator has been initialized, the step of updating the internal state based on the first scheme is configured to continuously generate a random number and update the internal state (seed) of the random number generator while in the standby state at step S520.

Further, the step of updating the internal state based on the first scheme is configured to determine whether an application program has requested a random number having a specific length during the performance of the operation in the standby state at step S530.

As a result of the determination at step S530, if it is determined that the random number having the specific length has been requested, the step of updating the internal state based on the first scheme is configured to generate the requested random number and update the seed (internal state) of the random number generator at step S540.

Thereafter, the generated random number is provided to the application program a step S550, and the generation of a random number and the update of a seed are continuously performed at step S520.

Figure 6:
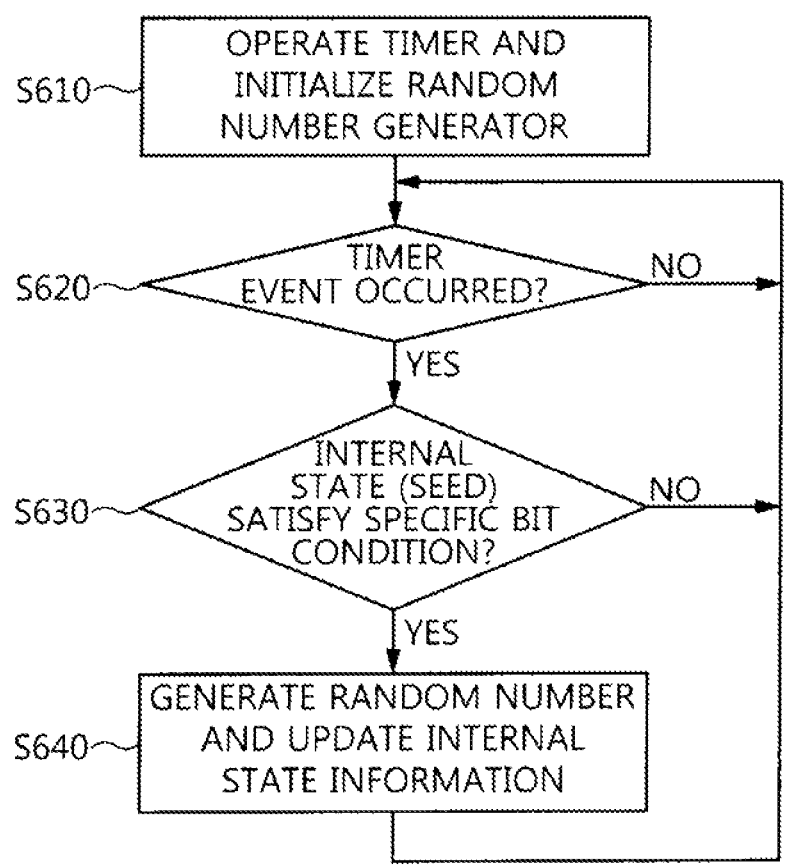
FIG. 6 is an operation flowchart showing an example of the step of updating an internal state based on a second scheme shown in FIG. 4.

FIG. 6 is an operation flowchart showing an example of the step of updating the internal state based on the second scheme shown in FIG. 4.

Referring to FIG. 6, the step of updating the internal state based on the second scheme due to the non-supply of external power is configured to perform an operation of initializing the timer and the random number generator at step S610.

After the timer and the random number generator have been initialized, the step of updating the internal state based on the second scheme is configured to wait for the occurrence of a timer event (interrupt) at step S620.

If a timer event (interrupt) does not occur, step S620 is maintained.

If a timer event (interrupt) has occurred, the step of updating the internal state based on the second scheme is configured to determine whether a specific bit of the internal state (seed) of the random number generator satisfies a preset bit condition by checking the specific bit at a previous time point at step S630.

For example, step S630 may be configured to determine whether the Lowest Significant Bit (LSB) of the random number generator seed satisfies a preset condition.

As a result of the determination at step S630, if the specific bit satisfies the preset bit condition, a random number is generated, and the internal state of the random number generator is updated at step S640.

After the internal state of the random number generator has been updated, the low-power microprocessor may be maintained in the standby state until a subsequent event occurs.

As a result of the determination at step S630, if the specific bit does not satisfy the preset bit condition, the low-power microprocessor may be maintained in the standby state.

Figure 7:
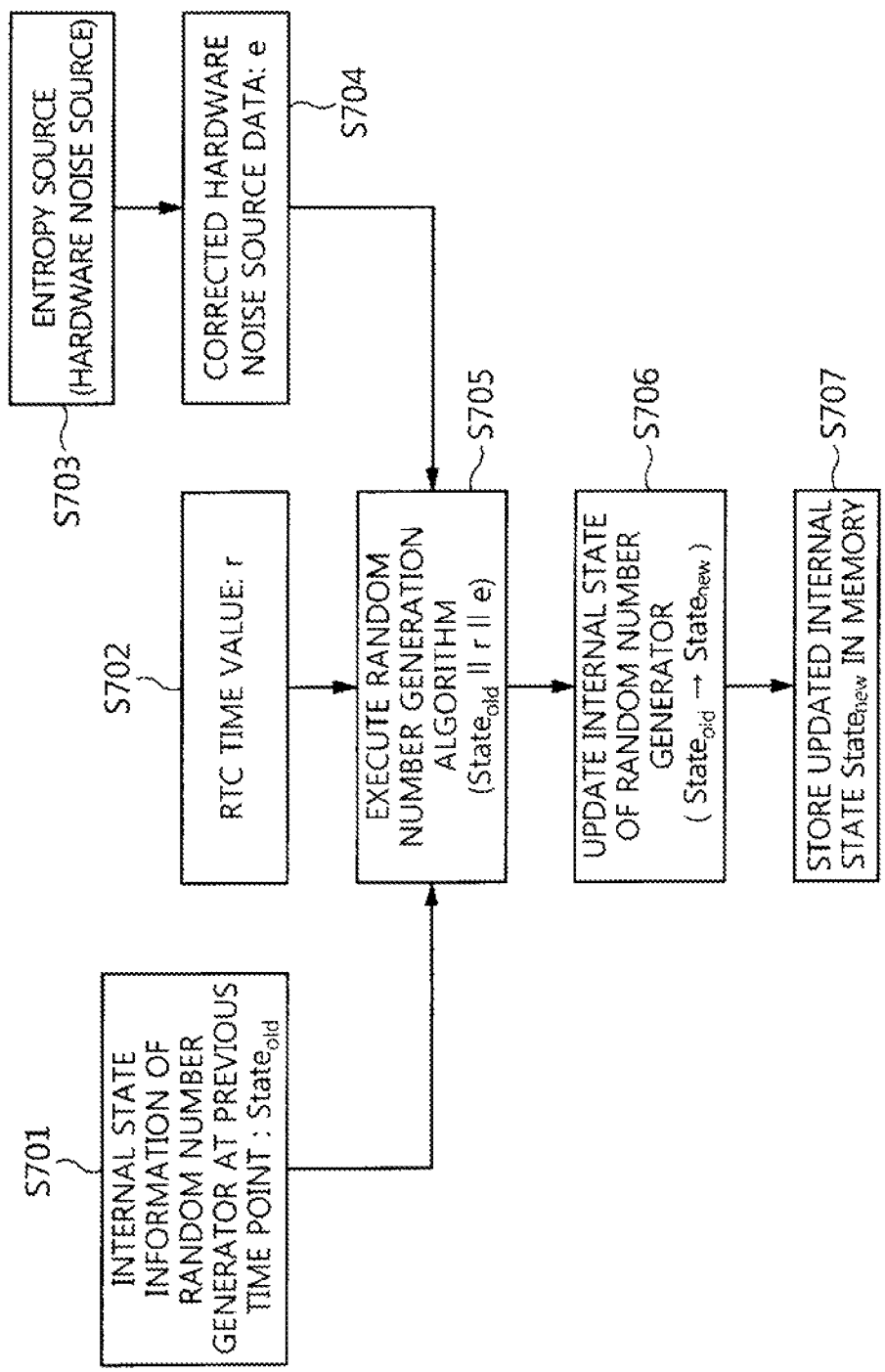
FIG. 7 is an operation flowchart showing an example of internal state update.

FIG. 7 is an operation flowchart showing an example of internal state update.

The generation of a random number and the update of an internal state shown in FIG. 5 or 6 are performed by the low-power microprocessor using entropy sources, such as hardware noise sources.

Referring to FIG. 7, the internal state ($State_{old}$) of the random number generator at a previous time point is received at step S701.

Further, the time value (r) of the RTC is received at step S702, and hardware noise source data is generated by each hardware noise source at step S703 and is corrected, and then corrected hardware noise source data (e) is generated and received at step S704.

The low-power microprocessor performs a process given in the following Equation (1) by receiving the internal state (seed; $State_{old}$) of the random number generator at the previous time point, the time value (r) of the RTC, and the corrected hardware noise source data (e) as input at step S705.

$$State_{new} = RNG(State_{old} \| r \| e) \qquad (1)$$

In Equation (1), $State_{new}$ denotes a new internal state, and RNG( ) denotes a random number generation algorithm.

After the random number generation algorithm has been executed, the low-power microprocessor updates the seed (internal state) while outputting the random number at step S706.

The updated seed is stored in the specific area of the internal memory of the low-power microprocessor at step S707.

The stored updated seed is used as a seed when the random number generation algorithm is subsequently executed.

In accordance with the present invention, when a timer event occurs, the update of an internal state corresponding to an active mode using the power of a battery is performed, thus enabling unpredictable random numbers to be generated and guaranteeing the confidentiality and integrity of authentication and encryption.

Further, in the present invention, different seed (internal state) update schemes are used when power is supplied and when power is not supplied, thus enabling unpredictable random numbers to be efficiently generated and preventing identical output random number sequences from being generated.

Furthermore, the present invention may provide unpredictable random numbers by performing minimal seed (internal state) updates even when operation is performed using a battery.

As described above, in the random number generation method and apparatus using the low-power microprocessor

What is claimed is:

1. A random number generation method comprising:
    determining, by a low-power microprocessor, whether external power is supplied to a random number generator;
    updating, by the low-power microprocessor, an internal state of the random number generator based on a first scheme if it is determined that the external power is supplied to the random number generator; and
    updating, by the low-power microprocessor, the internal state of the random number generator based on a second scheme different from the first scheme if it is determined that the external power is not supplied to the random number generator; wherein,
    updating the internal state of the random number generator based on the second scheme is configured to update the internal state of the random number generator in consideration of one or more of requirements specifying whether a timer event has occurred and whether the internal state of the random number generator satisfies a preset condition, by using power supplied from a battery; wherein,
    the preset condition is related to whether a preset bit of the internal state has been designated as a preset value.

2. The random number generation method of claim 1, wherein updating the internal state of the random number generator based on the first scheme is configured to continuously generate a random number and update the internal state while in a standby state, generate and provide a requested random number when an application program requests the random number, and then return to the standby state.

3. The random number generation method of claim 1, wherein the internal state is updated by generating a random number using an internal state at a previous time point, noise source data generated using an external hardware noise source, and a time value of a Real-Time Clock (RTC).

4. The random number generation method of claim 3, wherein the noise source data is corrected using a preset correction algorithm so as to improve random number characteristics.

5. A random number generator comprising:
    a battery for supplying power when external power is not supplied;
    a power switching circuit for selecting one of the external power and the power supplied from the battery based on a difference between voltages of the external power and the power supplied from the battery; and,
    a low-power microprocessor for updating an internal state required to generate a random number based on a first scheme using the external power, and for updating the internal state based on a second scheme different from the first scheme using the power supplied from the battery; wherein,
    the second scheme is configured to update the internal state of the random number generator in consideration of one or more of requirements specifying whether a timer event has occurred and whether the internal state of the random number generator satisfies a preset condition, by using power supplied from a battery; wherein
    the preset condition is related to whether a preset bit of the internal state has been designated as a preset value.

6. The random number generator of claim 5, further comprising:
    a hardware noise source for generating noise source data required to generate the random number; and
    a Real-Time Clock (RTC) for generating a time value required to generate the random number.

7. The random number generator of claim 5, wherein the first scheme is configured to continuously generate a random number and update the internal state while in a standby state, generate and provide a requested random number when an application program requests the random number, and then return to the standby state.

8. The random number generator of claim 5, wherein the internal state is updated by generating a random number using an internal state at a previous time point, noise source data generated using an external hardware noise source, and a time value of a Real-Time Clock (RTC).

9. The random number generator of claim 8, wherein the noise source data is corrected using a preset correction algorithm so as to improve random number characteristics.

* * * * *